(12) United States Patent
Chen et al.

(10) Patent No.: US 7,202,642 B1
(45) Date of Patent: Apr. 10, 2007

(54) SWITCHING REGULATOR CAPABLE OF RAISING SYSTEM STABILITY BY VIRTUAL RIPPLE

(75) Inventors: Ming-Hsueh Chen, Taipei County (TW); Chih-Yuan Chen, Hsinchu (TW)

(73) Assignee: Anpec Electronics Corporation, Hsin-Chu (TW)

( * ) Notice: Subject to any disclaimer, the term of this patent is extended or adjusted under 35 U.S.C. 154(b) by 0 days.

(21) Appl. No.: 11/457,812

(22) Filed: Jul. 16, 2006

(30) Foreign Application Priority Data

Mar. 22, 2006 (TW) .............................. 95109913 A (51) Int. Cl.
*G05F 1/613* (2006.01)

(52) U.S. Cl. ...................... 323/222; 323/282; 323/284

(58) Field of Classification Search ............... 323/222, 323/282, 284, 285
See application file for complete search history.

(56) References Cited

U.S. PATENT DOCUMENTS 5,847,554 A * 12/1998 Wilcox et al. ............... 323/282
6,229,293 B1 * 5/2001 Farrenkopf .................. 323/288
6,396,252 B1 * 5/2002 Culpepper et al. .......... 323/285
6,583,610 B2    6/2003 Groom et al.
6,813,173 B2   11/2004 Lipcsei
6,930,474 B2 *  8/2005 Wang .......................... 323/288
7,002,817 B2 *  2/2006 Lipcsei ........................ 363/98
7,019,504 B2 *  3/2006 Pullen et al. ................ 323/283
7,132,820 B2 * 11/2006 Walters et al. .............. 323/288

* cited by examiner

*Primary Examiner*—Bao Q. Vu
(74) *Attorney, Agent, or Firm*—Winston Hsu (57) ABSTRACT

A switching regulator includes a power stage, an output capacitor, a first reference voltage generator, a first virtual ripple generator, a comparator, and a constant-time trigger. The power stage includes a first switch, a second switch coupled to the first switch, and an output inductor coupled to the first switch and the second switch. The output capacitor coupled to the output inductor with an output voltage across the capacitor. The first virtual ripple generator is coupled to the first reference voltage generator for generating a first modulated reference voltage which reverses the output voltage according to the first reference voltage. The comparator includes a first input end coupled to the output inductor and the output capacitor and a second input end coupled to the first virtual ripple generator. The constant-time trigger is coupled between an output end of the comparator and a control end of the power stage.

23 Claims, 9 Drawing Sheets

SWITCHING REGULATOR CAPABLE OF RAISING SYSTEM STABILITY BY VIRTUAL RIPPLE

BACKGROUND OF THE INVENTION

1. Field of the Invention

The present invention relates to a switching regulator, and more particularly, to a switching regulator capable of raising system stability by virtual ripple.

2. Description of the Prior Art

Regulators usually include switching regulators and liner regulators. The characteristics of liner regulators are that they are cheap, easy to use and respond quickly. However the efficiency of liner regulators is poor, often consuming 50% of the power. Although a switching regulator has slow response, its power efficiency is great. Power consumption plays an important role in circuit design nowadays. As for a quick response requirement, switching regulators utilize a constant-time trigger to substitute for an error amplifier with additional frequency compensation elements used for controlling signal differences between PWM loops. The constant-time trigger is used for triggering a fixed on time or a fixed off time to control the whole switching regulator.

Figure 1:
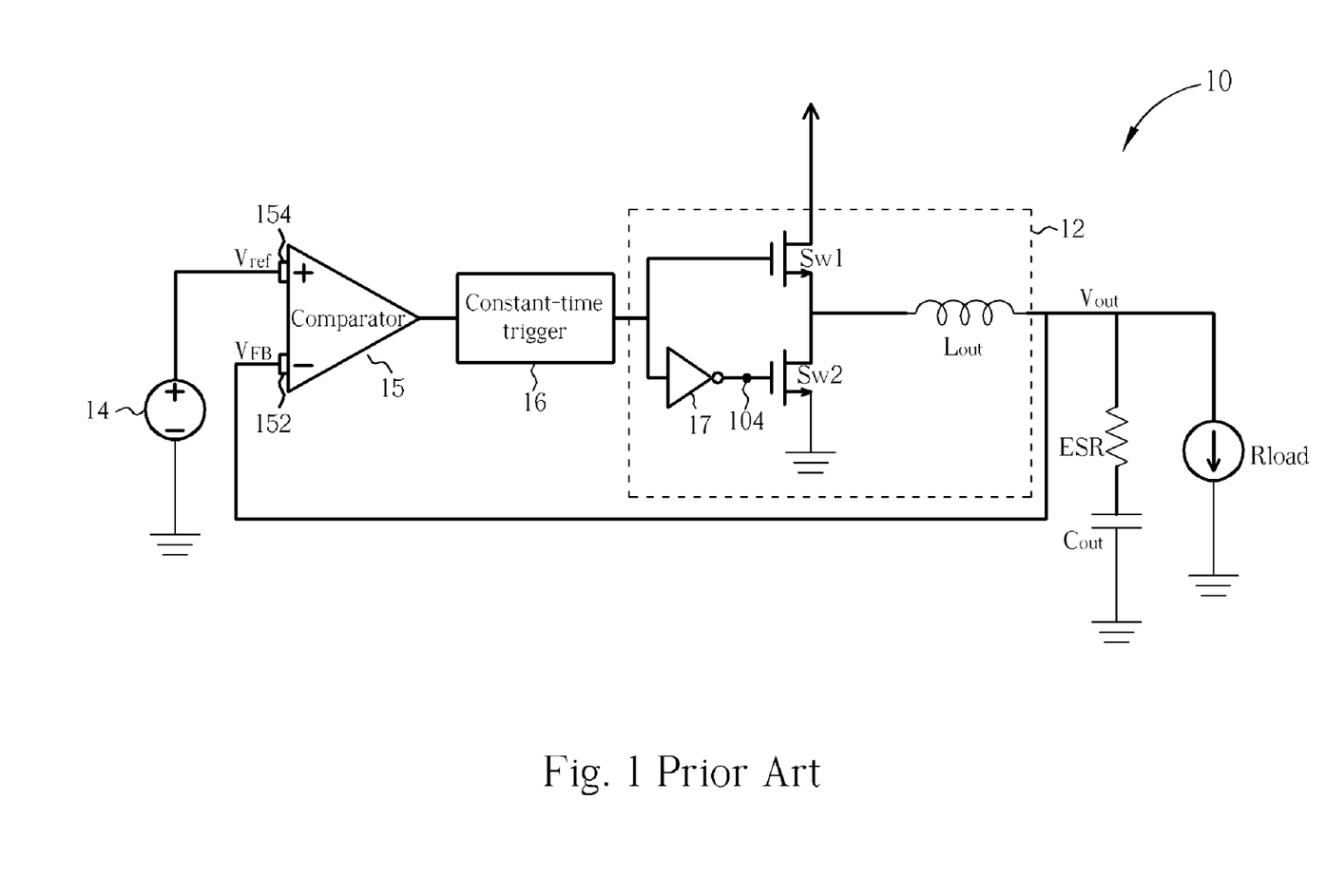
FIG. 1 is a diagram of a switching regulator according to prior art.

Please refer to FIG. 1. FIG. 1 is a diagram of a switching regulator 10 according to the prior art. The switching regulator 10 includes a power stage 12, an output capacitor Cout, a loading Rload, a reference voltage generator 14, a comparator 15, and a constant-time trigger 16. The power stage 12 includes a first switch SW1, a second switch SW2, an inverter 17, and an output inductor Lout. The second switch SW2 is coupled to the first switch SW1. The output inductor Lout is coupled to the first switch SW1 and the second switch SW2. The inverter 17 is coupled to the constant-time trigger 16 and a control end 104 of the second switch SW2 for processing an inverse operation on a signal outputted from the constant-time trigger 16. The output capacitor Cout is coupled to the output inductor Lout with an output voltage Vout across the capacitor. The output capacitor Cout further includes an equivalent series resistance ESR. The reference voltage generator 14 is used for generating a reference voltage Vref. The comparator 15 includes a first input end 152 coupled to the output inductor Lout and the output capacitor Cout for receiving a feedback voltage $V_{FB}$ (equals the output voltage Vout). The comparator 15 includes a second input end 154 coupled to the reference voltage generator 14. The constant-time trigger 16 is coupled to the comparator 15 and the power stage 12. The constant-time trigger 16 is used for controlling turning on and off the first switch SW1 and the second switch SW2 of the power stage 12 according to a result of the comparator 15. The comparator 15 is an error comparator. The first switch SW1 and the second switch SW2 are metal-oxide semiconductor transistors (MOS). When the constant-time trigger 16 is an on-time trigger, it is used for controlling on time of the first switch SW1 and the second switch SW2. When the constant-time trigger 16 is an off-time trigger, it is used for controlling off time of the first switch SW1 and the second switch SW2.

Figure 2:
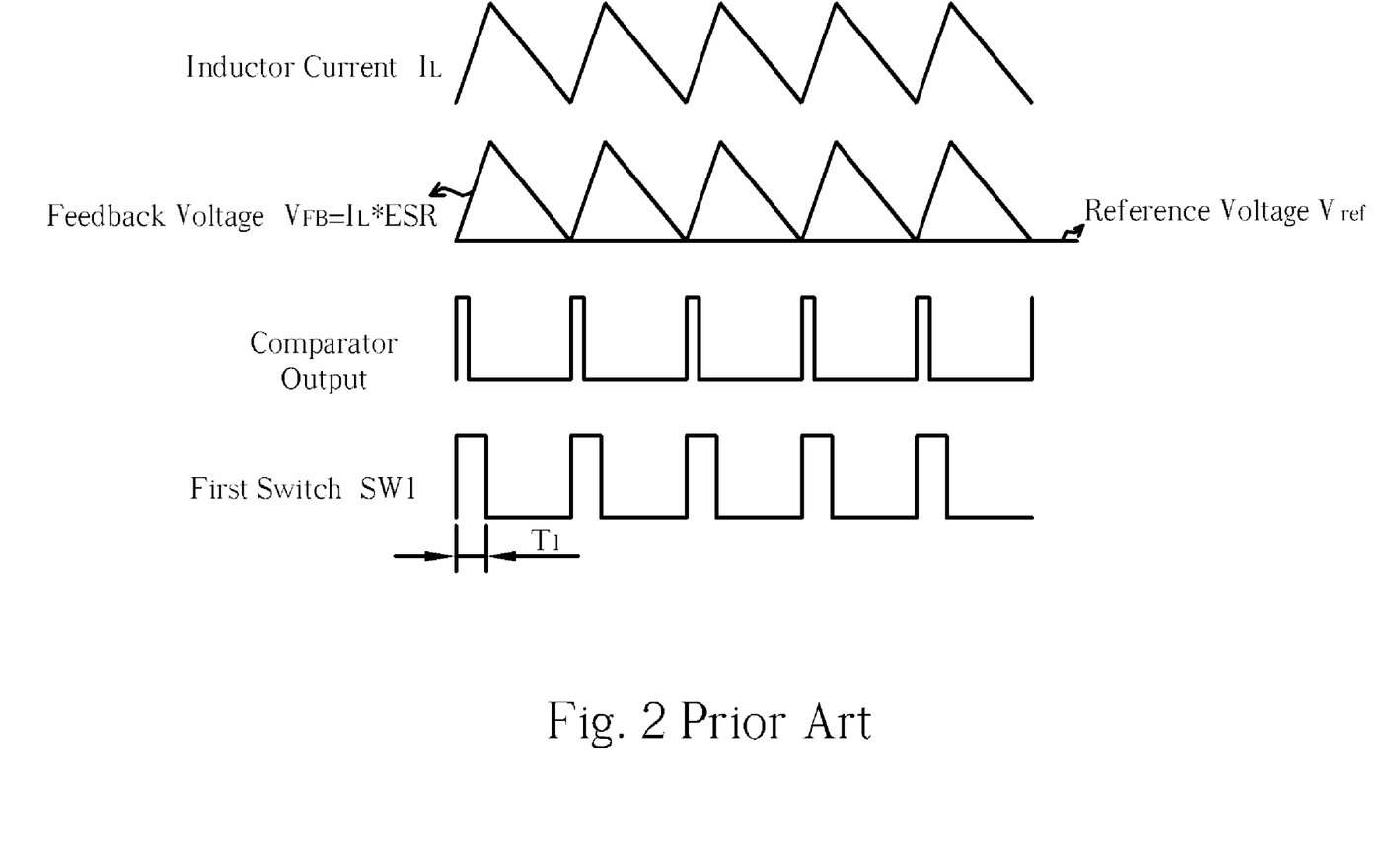
FIG. 2 is a diagram illustrating signal waveforms in FIG. 1.

Please refer to FIG. 2 and FIG. 1. FIG. 2 is a diagram illustrating signal waveforms in FIG. 1. The upper waveform is a variation of an inductor current $I_L$ in time, where it rises in a positive slope for a span and drops in a negative slope for a span. Due to the output voltage Vout equaling the feedback voltage $V_{FB}$, the feedback voltage $V_{FB}$ could be represented as the product of the inductor current $I_L$ and the equivalent series resistance ESR. Assume that the constant-time trigger 16 is an on time trigger for controlling turning on the first switch SW1 for a fixed time $T_1$. The comparator 15 is used for comparing the feedback voltage $V_{FB}$ and the reference voltage Vref. When the feedback voltage $V_{FB}$ is lower than the reference voltage Vref, the comparator 15 triggers a high level signal to the constant-time trigger 16. The constant-time trigger 16 controls the first switch SW1 turning on for the fixed time $T_1$ and turning off the first switch SW1. The constant-time trigger 16 turns on the second switch SW2 to form a loop.

Figure 3:
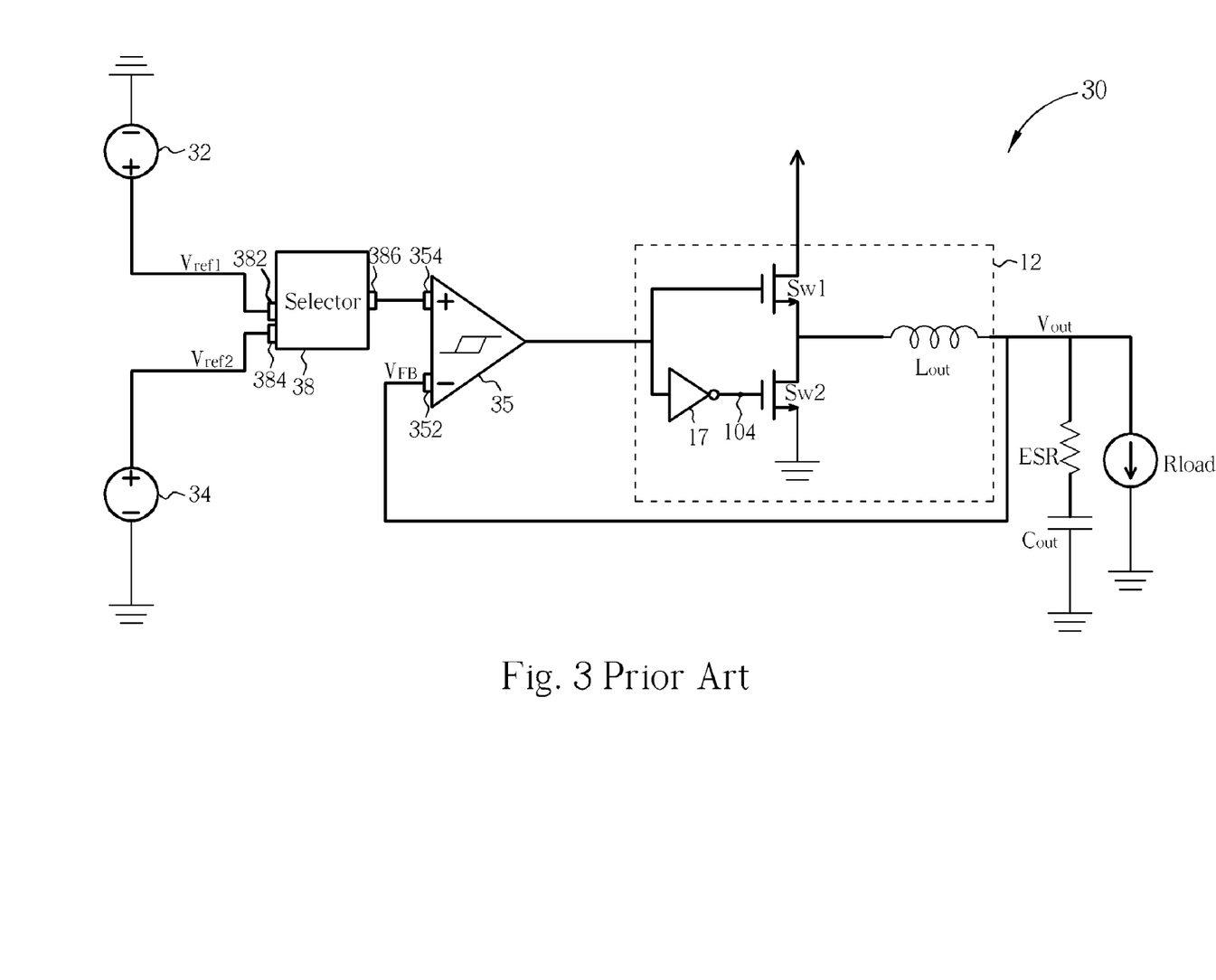
FIG. 3 is a diagram of another switching regulator according to prior art.

Please refer to FIG. 3. FIG. 3 is a diagram of a switching regulator 30 according to the prior art. The switching regulator 30 includes a power stage 12, an output capacitor Cout, a loading Rload, a first reference voltage generator 32, a second reference voltage generator 34, a selector 38, and a comparator 35. The power stage 12 includes a first switch SW1, a second switch SW2, an inverter 17, and an output inductor Lout and is the same as the power stage 12 in FIG. 1. The output capacitor Cout is coupled to the output inductor Lout with an output voltage Vout across the capacitor. The output capacitor Cout further includes an equivalent series resistance ESR. The loading Rload is coupled to the output capacitor Cout and the output inductor Lout. The first reference voltage generator 32 is used for generating a first reference voltage Vref1. The second reference voltage generator 34 is used for generating a second reference voltage Vref2. The comparator 35 includes a first input end 352 coupled to the output inductor Lout and the output capacitor Cout for receiving a feedback voltage $V_{FB}$ (equals the output voltage Vout). The comparator 35 includes a second input end 354 coupled to an output end 386 of the selector 38. The selector 38 includes a first input end 382 coupled to the first reference voltage generator 32 for receiving the first reference voltage Vref1, and a second input end 384 coupled to the second reference voltage generator 34 for receiving the second reference voltage Vref2. The selector 38 is used for selecting the first reference voltage Vref1 or the second reference voltage Vref2 to enter the second input end 354 of the comparator 35. The comparator 35 is a hysteresis comparator and is used for comparing the output voltage Vout with the first reference voltage Vref1 or the second reference voltage Vref2. The output of the comparator 35 is used for controlling turning on and off the first switch SW1 and the second SW2 of the power stage 12. The first switch SW1 and the second switch SW2 are metal-oxide semiconductor transistors (MOS).

Figure 4:
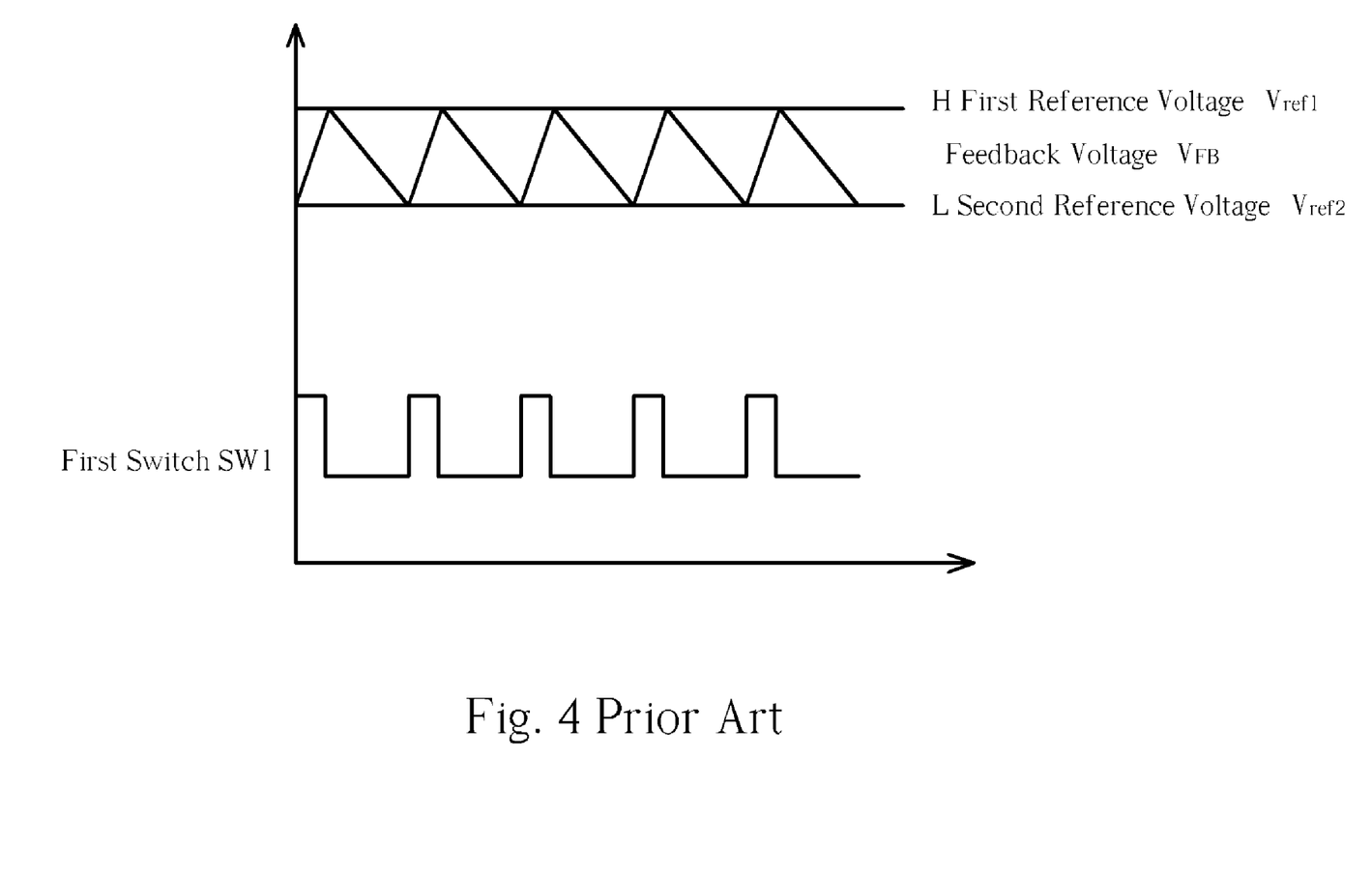
FIG. 4 is a diagram illustrating signal waveforms in FIG. 3.

Please refer to FIG. 4 and FIG. 3. FIG. 4 is a diagram illustrating signal waveforms in FIG. 3. The difference between FIG. 4 and FIG. 2 is that the comparator 35 is a hysteresis comparator. The first input end 352 of the comparator 35 is used for receiving the feedback voltage $V_{FB}$, and the second input end 354 of the comparator 35 is used for receiving the first reference voltage Vref1 or the second reference voltage Vref2. When the feedback voltage $V_{FB}$ is smaller than the second reference voltage Vref2, the comparator 35 triggers a high level signal to turn on the first switch SW1. When the feedback voltage $V_{FB}$ is greater than the first reference voltage Vref1, the comparator 35 triggers a low level signal to turn off the first switch SW1 to form a loop.

Virtual ripple applications are already disclosed in U.S. Pat. No. 6,583,610 "Virtual Ripple generation in Switchmode power Supplies" and U.S. Pat. No. 6,813,173 "DC-to-DC Converter with Improved Transient Response". In U.S. Pat. No. 6,583,610, the method of work is adding a triangle-like wave signal to the feedback side to differentiate the variation of the feedback voltage and improve the discrimination of the comparator. In U.S. Pat. No. 6,813,173, the method of work is adding a signal equaling the product of the inductor current $I_L$ and the equivalent series resistance ESR to simulate the waveform of the feedback voltage applied in large equivalent series resistance.

Due to the equivalent series resistance ESR of the output capacitor Cout used in today's switching regulator being small, such as MLCC capacitors, there is phase difference generated in the feedback voltage $V_{FB}$ that causes system instability.

SUMMARY OF THE INVENTION

The claimed invention provides a switching regulator capable of raising system stability by virtual ripple. The switching regulator includes a power stage, an output capacitor, a first reference voltage generator, a first virtual ripple generator, a comparator, and a constant-time trigger. The power stage includes a first switch, a second switch coupled to the first switch, and an output inductor coupled to the first switch and the second switch. The output capacitor coupled to the output inductor with an output voltage across the capacitor. The first reference voltage generator is used for generating a first reference voltage. The first virtual ripple generator is coupled to the first reference voltage generator for generating a first modulated reference voltage which reverses the output voltage according to the first reference voltage. The comparator includes a first input end coupled to the output inductor and the output capacitor and a second input end coupled to the first virtual ripple generator. The constant-time trigger coupled between an output end of the comparator and a control end of the power stage. The constant-time trigger is used for controlling turning on and off the first switch and the second switch of the power stage according to a result of the comparator.

These and other objectives of the present invention will no doubt become obvious to those of ordinary skill in the art after reading the following detailed description of the preferred embodiment that is illustrated in the various figures and drawings.

DETAILED DESCRIPTION

Figure 5:
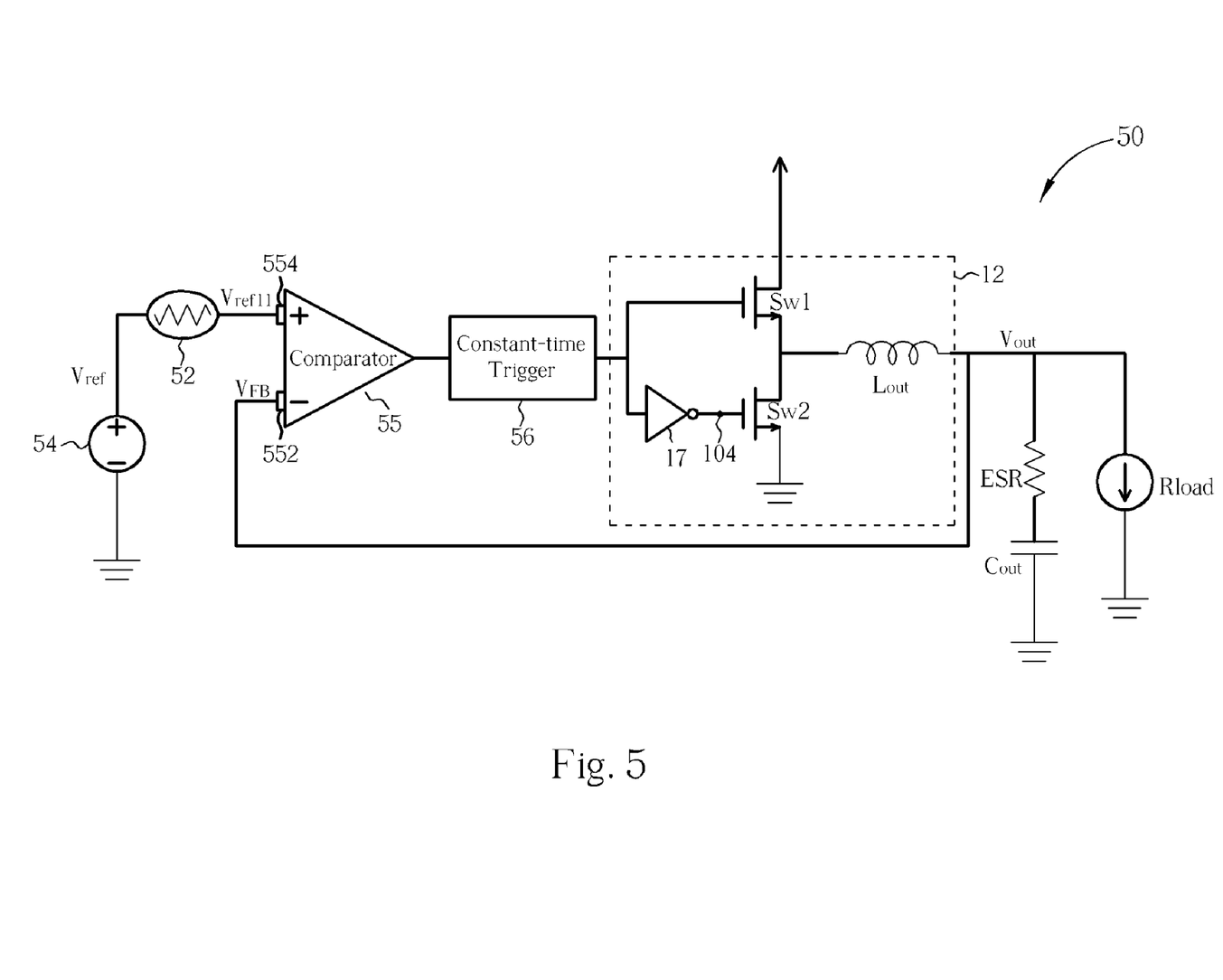
FIG. 5 is a diagram of a switching regulator according to the present invention.

Please refer to FIG. 5 that is a diagram of a switching regulator 50 according to the present invention. The switching regulator 50 includes a power stage 12, an output capacitor Cout, a loading Rload, a reference voltage generator 54, a first virtual ripple generator 52, a comparator 55, and a constant-time trigger 56. The power stage 12 includes a first switch SW1, a second switch SW2, an inverter 17, and an output inductor Lout. The second switch SW2 is coupled to the first switch SW1. The output inductor Lout is coupled to the first switch SW1 and the second switch SW2. The inverter 17 is coupled to the constant-time trigger 56 and a control end 104 of the second switch SW2 for processing an inverse operation on a signal outputted from the constant-time trigger 56. The output capacitor Cout is coupled to the output inductor Lout with an output voltage Vout across the capacitor. The output capacitor Cout further includes an equivalent series resistance ESR. The loading Rload is coupled to the output capacitor Cout and the output inductor Lout. The reference voltage generator 54 is used for generating a reference voltage Vref. The first virtual ripple generator 52 is coupled to the reference voltage generator 54 for generating a first modulated reference voltage Vref11 which reverses the output voltage Vout according to the reference voltage Vref. The comparator 55 includes a first input end 552 coupled to the output inductor Lout and the output capacitor Cout for receiving a feedback voltage $V_{FB}$ (equals the output voltage Vout). The comparator 55 includes a second input end 554 coupled to the first virtual ripple generator 52. The constant-time trigger 56 is coupled to the comparator 55 and the power stage 12. The constant-time trigger 56 is used for controlling turning on and off the first switch SW1 and the second switch SW2 of the power stage 12 according to a result of the comparator 55. The comparator 55 is an error comparator. The first switch SW1 and the second switch SW2 are metal-oxide semiconductor transistors (MOS). When the constant-time trigger 56 is an on-time trigger, it is used for controlling on time of the first switch SW1 and the second switch SW2. When the constant-time trigger 56 is an off-time trigger, it is used for controlling off time of the first switch SW1 and the second switch SW2.

Figure 6:
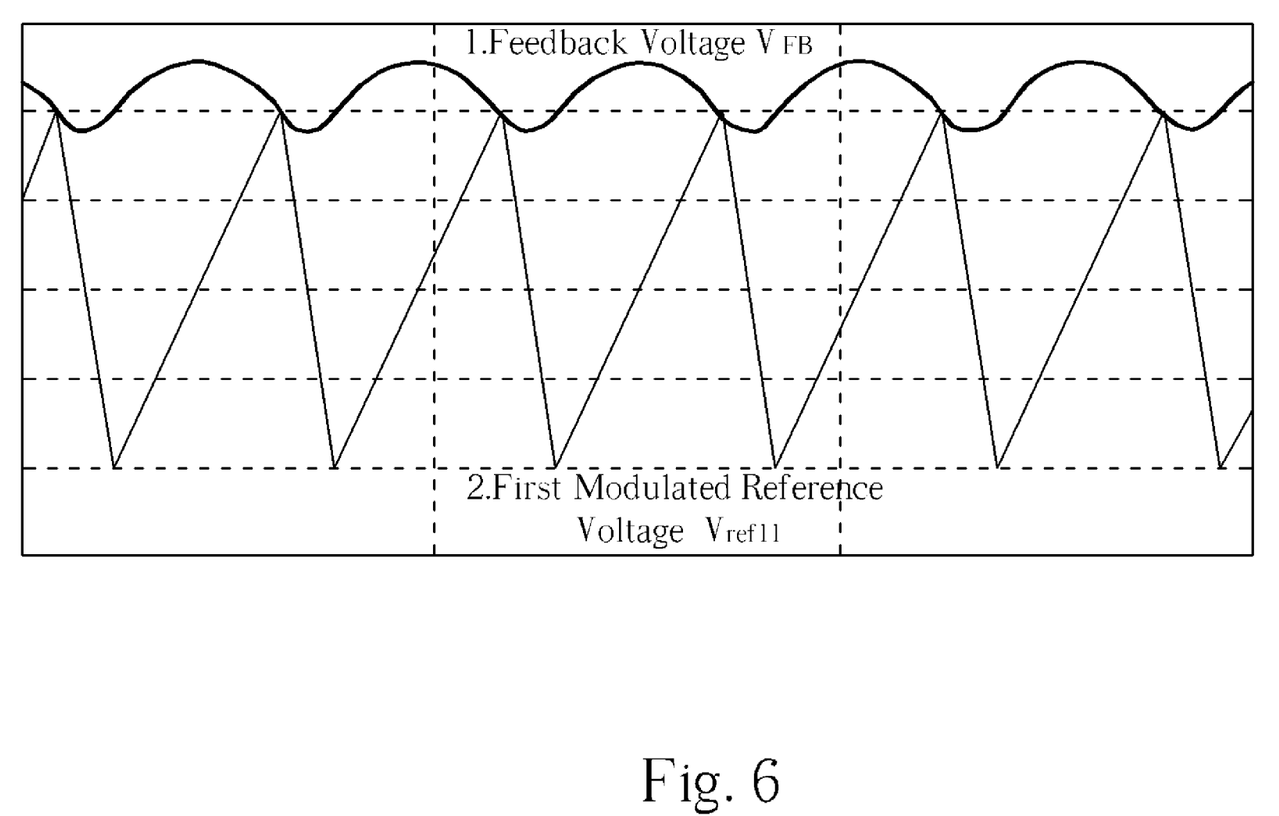
FIG. 6 is a diagram illustrating waveforms of the feedback voltage and the first modulated reference voltage in FIG. 5.

Please refer to FIG. 6. FIG. 6 is a diagram illustrating waveforms of the feedback voltage $V_{FB}$ and the first modulated reference voltage Vref11 in FIG. 5. The difference between FIG. 6 and FIG. 2 is that the first modulated reference voltage Vref11 is not a fixed value but a signal similar to but reverses the feedback voltage $V_{FB}$. The first modulated reference voltage Vref11 is modulated and generated by the first virtual ripple generator 52 according to the reference voltage Vref. When turning on the first switch SW1 and turning off the second switch SW2, the first modulated reference voltage Vref11 is a negatively sloped signal. When turning off the first switch SW1 and turning on the second switch SW2, the first modulated reference voltage Vref11 is a positively sloped signal. The first modulated reference voltage Vref11 after modulation and the feedback voltage $V_{FB}$ are signals transmitted to these two input ends of the comparator 55. As shown in FIG. 6, the upper waveform is the feedback voltage $V_{FB}$, and the lower waveform is the first modulated reference voltage Vref11.

Figure 7:
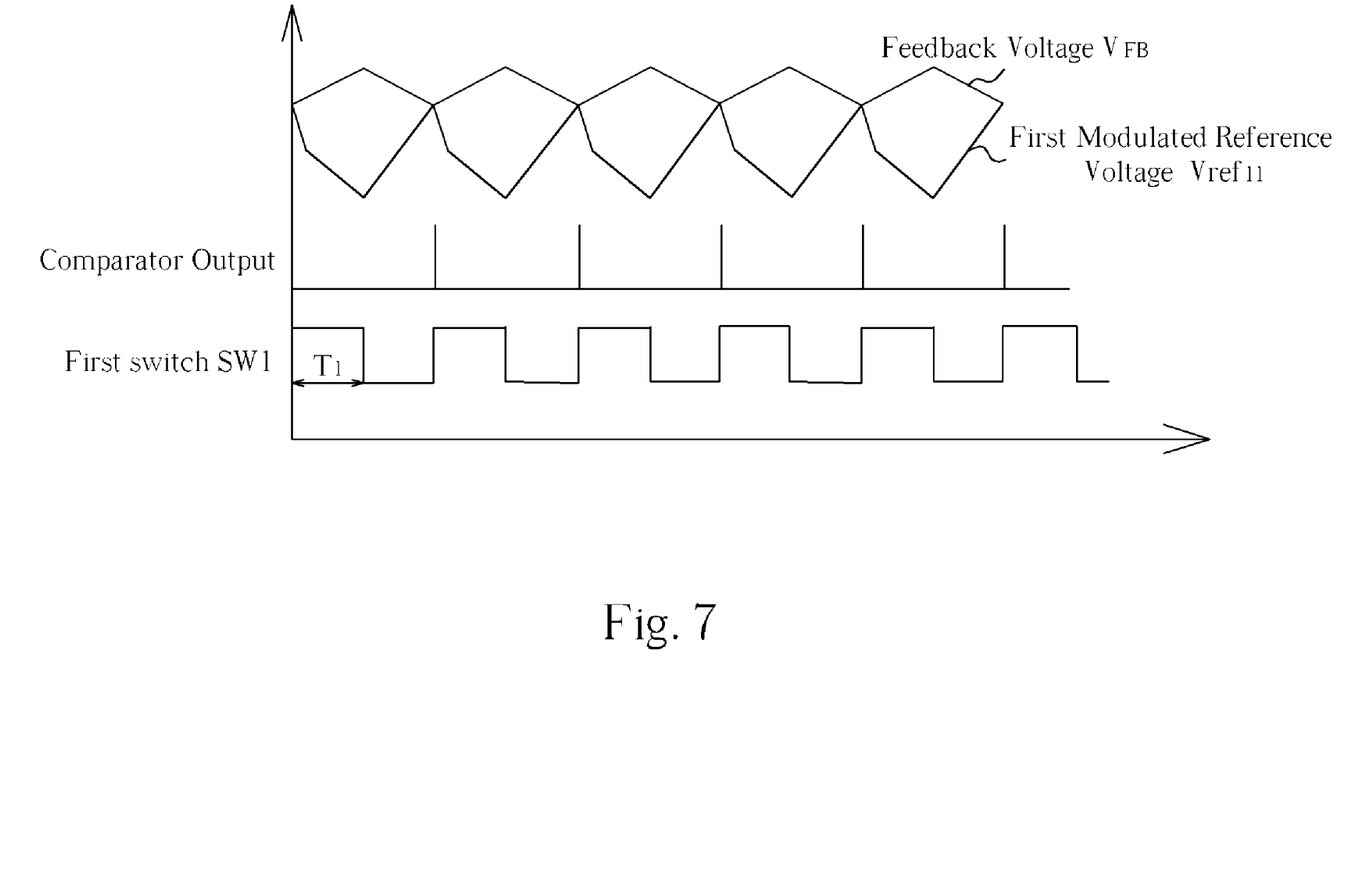
FIG. 7 is a diagram illustrating signal waveforms in FIG. 5.

Please refer to FIG. 7. FIG. 7 is a diagram illustrating signal waveforms in FIG. 5. The first modulated reference voltage Vref11 is a signal similar to but reverses the feedback voltage $V_{FB}$. The difference between FIG. 7 and FIG. 6 is that the slope of the first modulated reference voltage Vref11 is not fixed. Deserving to be mentioned is that the trigger point is important. When turning on the first switch SW1 and turning off the second switch SW2, the first modulated reference voltage Vref11 is a negatively sloped signal. When turning off the first switch SW1 and turning on the second switch SW2, the first modulated reference voltage Vref11 is a positively sloped signal. When the feedback voltage $V_{FB}$ is smaller than the first modulated reference voltage Vref11, the comparator 55 triggers a high level signal to the constant-time trigger 56. The constant-time trigger 56 controls the first switch SW1 turning on for the fixed time $T_1$ and turning off the first switch SW1. The constant-time trigger 56 turns on the second switch SW2 to form a loop.

Figure 8:
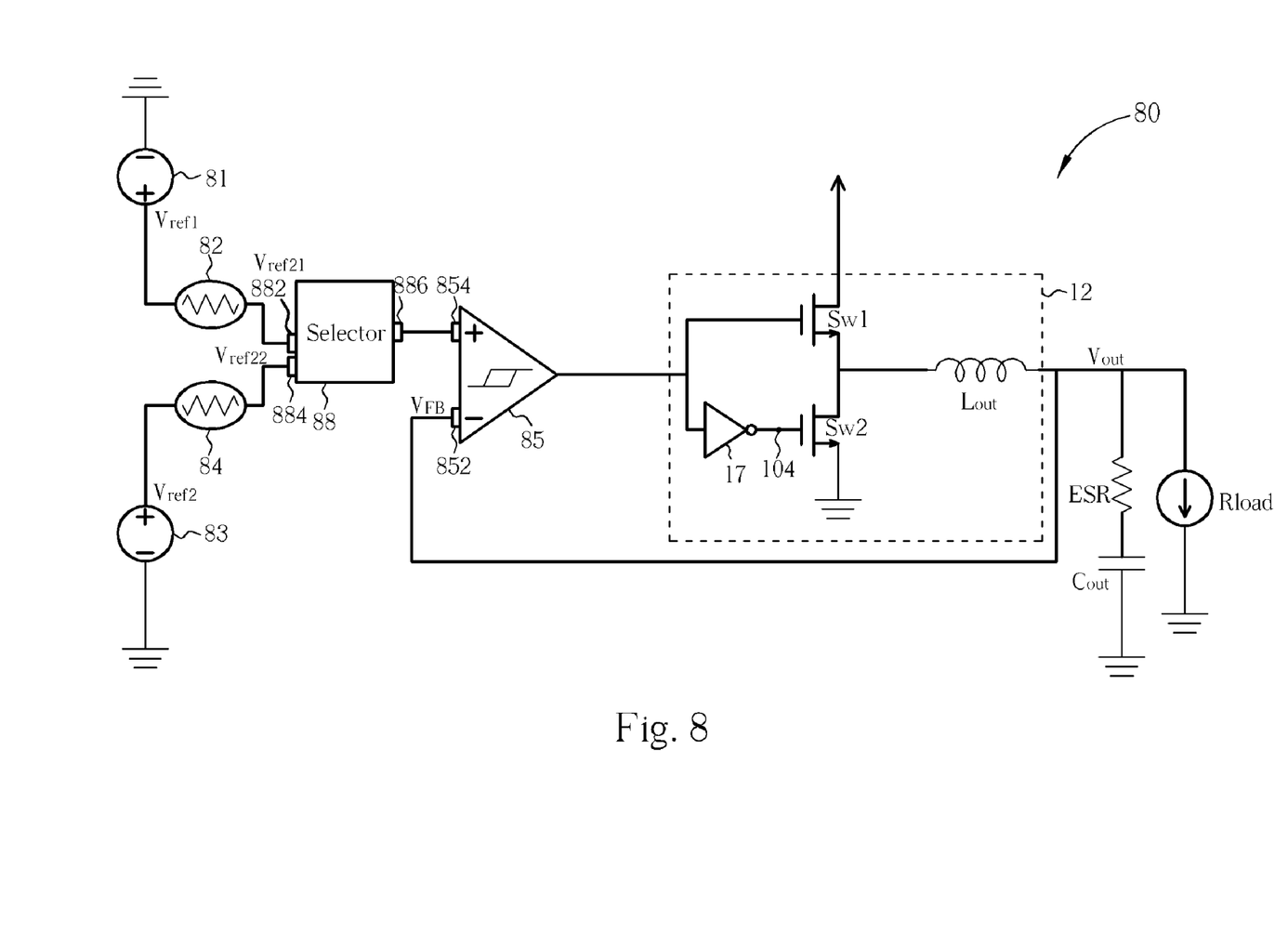
FIG. 8 is a diagram of another switching regulator according to the present invention.

Please refer to FIG. 8 that is a diagram of a switching regulator 80 according to the present invention. The switching regulator 80 includes a power stage 12, an output capacitor Cout, a loading Rload, a first reference voltage generator 81, a second reference voltage generator 83, a first virtual ripple generator 82, a second virtual ripple generator 84, a selector 88, and a comparator 85. The power stage 12 includes a first switch SW1, a second switch SW2, an inverter 17, and an output inductor Lout and is the same as the power stage 12 in FIG. 5. The output capacitor Cout is coupled to the output inductor Lout with an output voltage Vout across the capacitor. The output capacitor Cout further includes an equivalent series resistance ESR. The loading Rload is coupled to the output capacitor Cout and the output inductor Lout. The first reference voltage generator 81 is used for generating a first reference voltage Vref1. The second reference voltage generator 83 is used for generating a second reference voltage Vref2.

The first virtual ripple generator 82 is coupled to the first reference voltage generator 81 for generating a first modulated reference voltage Vref21 which reverses the output voltage Vout according to the first reference voltage Vref1. The second virtual ripple generator 84 is coupled to the second reference voltage generator 83 for generating a second modulated reference voltage Vref22 which reverses the output voltage Vout according to the second reference voltage Vref2. The comparator 85 includes a first input end 852 coupled to the output inductor Lout and the output capacitor Cout for receiving a feedback voltage $V_{FB}$ (equals the output voltage Vout). The comparator 85 includes a second input end 854 coupled to an output end 886 of the selector 88. The selector 88 includes a first input end 882 coupled to the first virtual ripple generator 82 for receiving the first modulated reference voltage Vref21, and a second input end 884 coupled to the second virtual ripple generator 84 for receiving the second modulated reference voltage Vref22. The selector 88 is used for selecting the first modulated reference voltage Vref21 or the second modulated reference voltage Vref22 to enter the second input end 854 of the comparator 85. The comparator 85 is a hysteresis comparator and is used for comparing the output voltage Vout with the first modulated reference voltage Vref21 or the second modulated reference voltage Vref22. The output of the comparator 85 is used for controlling turning on and off the first switch SW1 and the second SW2 of the power stage 12. The first switch SW1 and the second switch SW2 are metal-oxide semiconductor transistors (MOS).

Figure 9:
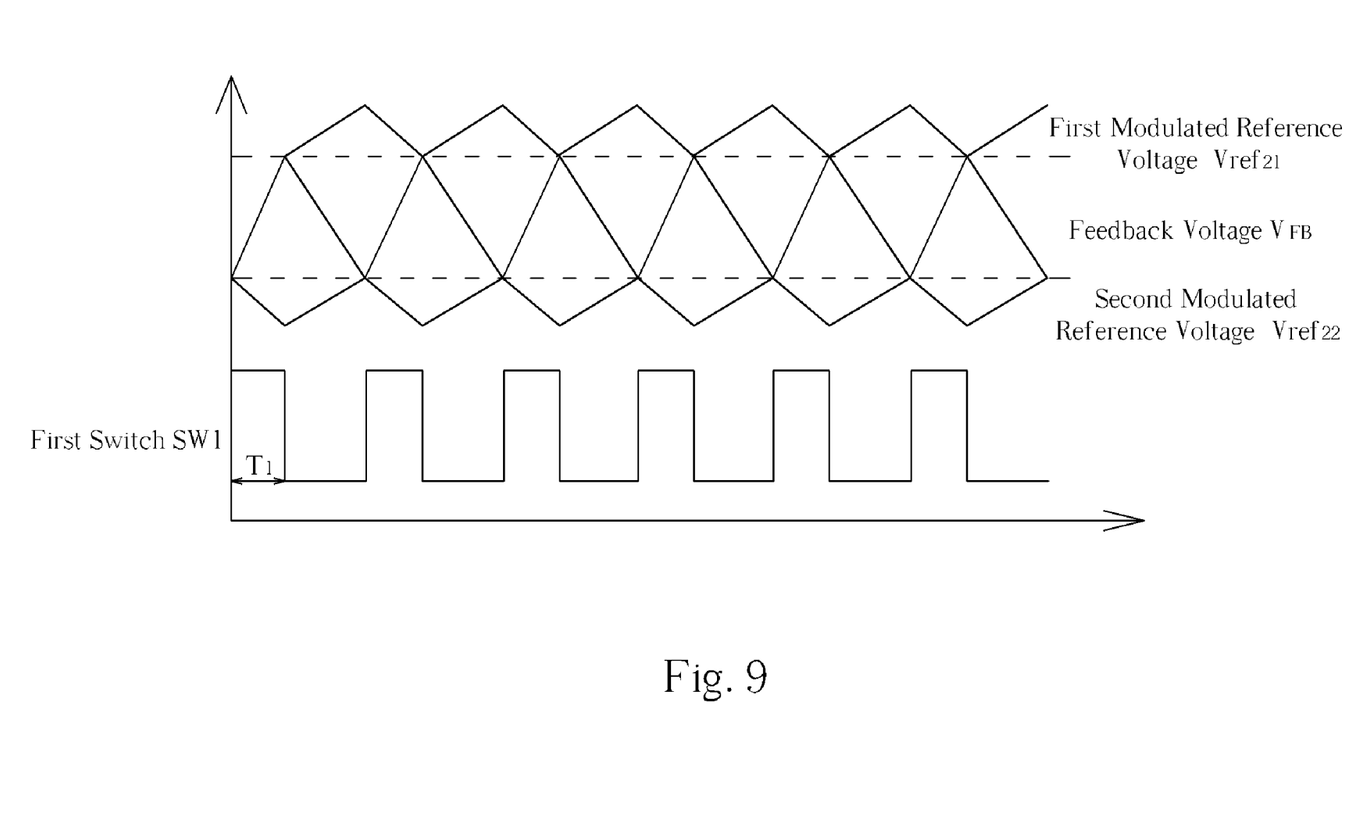
FIG. 9 is a diagram illustrating signal waveforms in FIG. 8.

Please refer to FIG. 9 and FIG. 8. FIG. 9 is a diagram illustrating signal waveforms in FIG. 8. The difference between FIG. 9 and FIG. 7 is that the comparator 85 is a hysteresis comparator. The first input end 852 of the comparator 85 is used for receiving the feedback voltage $V_{FB}$, and the second input end 854 of the comparator 85 is used for receiving the first modulated reference voltage Vref21 or the second modulated reference voltage Vref22. When the feedback voltage $V_{FB}$ is smaller than the second modulated reference voltage Vref22, the comparator 85 triggers a high level signal to turn on the first switch SW1. When the feedback voltage $V_{FB}$ is greater than the first modulated reference voltage Vref21, the comparator 85 triggers a low level signal to turn off the first switch SW1 to form a loop.

The above-mentioned embodiments illustrate but do not limit the present invention. The mentioned comparator is not restricted to an error comparator, it could be a hysteresis comparator. The constant-time trigger 56 could be an on-time trigger or an off-time trigger for controlling turning on or turning off the first switch SW1 and the second switch SW2. The inverter 17 can be coupled between the constant-time trigger 56 (or the comparator 85) and a control end of the first switch SW1. The switching regulators 50 and 80 include one power stage 12 but can be expanded to two or a plurality of power stages 12. Furthermore, the slope of the modulated reference voltage generated by the first virtual ripple generator 52 and 82 or the second virtual ripple generator 884 is not limited to a fixed value. The waveforms of the modulated reference voltages are not restricted to embodiments mentioned in the present invention.

In conclusion, the present invention provides a switching regulator capable of raising system stability by virtual ripple. Generating a modulated reference voltage reverses the output voltage by a virtual ripple generator according to the reference voltage. Inputting the modulated reference voltage and the output voltage to two input ends of a comparator, the comparator can make a decision correctly. Triggering a constant-time trigger at correct timings controls on time and off time of the first switch SW1 and the second switch SW2. This can raise system stability and increase the application range of the switching regulator. The present invention is applied to not only general switching regulators but also hysteresis switching regulators.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A switching regulator comprising:
    a power stage, the power stage comprising:
        a first switch;
        a second switch coupled to the first switch; and
        an output inductor coupled to the first switch and the second switch;
    an output capacitor coupled to the output inductor with an output voltage across the capacitor;
    a first reference voltage generator used for generating a first reference voltage;
    a first virtual ripple generator coupled to the first reference voltage generator for generating a first modulated reference voltage which reverses the output voltage according to the first reference voltage;
    a comparator having a first input end coupled to the output inductor and the output capacitor and a second input end coupled to the first virtual ripple generator; and
    a constant-time trigger coupled between an output end of the comparator and a control end of the power stage, the constant-time trigger used for controlling turning on and off the first switch and the second switch of the power stage according to a result of the comparator.

2. The switching regulator of claim 1 wherein the comparator is an error comparator, a second input end of the error comparator used for receiving the first modulated reference voltage and the error comparator used for comparing the output voltage with the first modulated reference voltage.

3. The switching regulator of claim 1 further comprising:
a second reference voltage generator used for generating a second reference voltage; and
a second virtual ripple generator coupled to the second reference voltage generator for generating a second modulated reference voltage which reverses the output voltage according to the second reference voltage.

4. The switching regulator of claim 3 wherein the comparator is a hysteresis comparator, a second input end of the hysteresis comparator used for receiving the first modulated reference voltage or the second modulated reference voltage and the hysteresis comparator used for comparing the output voltage with the first modulated reference voltage or the second modulated reference voltage.

5. The switching regulator of claim 3 further comprising a selector coupled between an output end of the first virtual ripple generator, an output end of the second virtual ripple generator, and the second input end of the hysteresis comparator, the selector used for selecting the first modulated reference voltage or the second modulated reference voltage to enter the second input end of the hysteresis comparator.

6. The switching regulator of claim 1 further comprising a loading coupled to the output capacitor and the output inductor.

7. The switching regulator of claim 1 wherein the output capacitor comprises an equivalent series resistance.

8. The switching regulator of claim 1 wherein the first switch and the second switch are metal-oxide semiconductor transistors (MOS).

9. The switching regulator of claim 1 further comprising an inverter coupled to the constant-time trigger and a control end of the second switch for processing an inverse operation on a signal outputted from the constant-time trigger.

10. The switching regulator of claim 1 wherein the constant-time trigger is used for controlling the on time of the first switch and the second switch.

11. The switching regulator of claim 1 wherein the constant-time trigger is an on-time trigger.

12. The switching regulator of claim 1 wherein the constant-time trigger is an off-time trigger.

13. A switching regulator comprising:
a plurality of power stages, wherein each power stage comprises:
a first switch;
a second switch coupled to the first switch; and
an output inductor coupled to the first switch and the second switch;
an output capacitor coupled to the plurality of power stages with an output voltage across the capacitor;
a first reference voltage generator used for generating a first reference voltage;
a first virtual ripple generator coupled to the first reference voltage generator for generating a first modulated reference voltage which reverses the output voltage according to the first reference voltage;
a comparator having a first input end coupled to the plurality of power stages and the output capacitor for receiving the output voltage and a second input end coupled to the first virtual ripple generator; and
a constant-time trigger coupled between an output end of the comparator and a control end of the plurality of power stages, the constant-time trigger used for controlling turning on and off the first switch and the second switch of the power stage according to a result of the comparator.

14. The switching regulator of claim 13 wherein the comparator is an error comparator, a second input end of the error comparator used for receiving the first modulated reference voltage and the error comparator used for comparing the output voltage with the first modulated reference voltage.

15. The switching regulator of claim 13 further comprising:
a second reference voltage generator used for generating a second reference voltage; and
a second virtual ripple generator coupled to the second reference voltage generator for generating a second modulated reference voltage which reverses the output voltage according to the second reference voltage.

16. The switching regulator of claim 15 wherein the comparator is a hysteresis comparator, a second input end of the hysteresis comparator used for receiving the first modulated reference voltage or the second modulated reference voltage and the hysteresis comparator used for comparing the output voltage with the first modulated reference voltage or the second modulated reference voltage.

17. The switching regulator of claim 15 further comprising a selector coupled between an output end of the first virtual ripple generator, an output end of the second virtual ripple generator, and the second input end of the hysteresis comparator, the selector used for selecting the first modulated reference voltage or the second modulated reference voltage to enter the second input end of the hysteresis comparator.

18. The switching regulator of claim 13 further comprising a loading coupled to the output capacitor and the output inductor.

19. The switching regulator of claim 13 wherein the output capacitor comprises an equivalent series resistance.

20. The switching regulator of claim 13 wherein the first switch and the second switch are metal-oxide semiconductor transistors (MOS).

21. The switching regulator of claim 13 further comprising an inverter coupled to the constant-time trigger and a control end of the second switch for processing an inverse operation on a signal outputted from the constant-time trigger.

22. The switching regulator of claim 13 wherein the constant-time trigger is an on-time trigger.

23. The switching regulator of claim 13 wherein the constant-time trigger is an off-time trigger.

* * * * *